United States Patent
Kitazoe et al.

(10) Patent No.: US 7,542,444 B2
(45) Date of Patent: Jun. 2, 2009

(54) STORED RADIO BEARER CONFIGURATIONS FOR UMTS NETWORKS

(75) Inventors: Masato Kitazoe, Machida (JP);
Francesco Grilli, San Diego, CA (US);
Nathan Edward Tenny, Poway, CA (US)

(73) Assignee: QULACOMM Incorporated, San Diego, CA (US)

( * ) Notice: Subject to any disclaimer, the term of this patent is extended or adjusted under 35 U.S.C. 154(b) by 616 days.

(21) Appl. No.: 11/388,560

(22) Filed: Mar. 23, 2006

(65) Prior Publication Data

US 2006/0229102 A1    Oct. 12, 2006

Related U.S. Application Data

(60) Provisional application No. 60/665,221, filed on Mar. 25, 2005, provisional application No. 60/724,005, filed on Oct. 6, 2005.

(51) Int. Cl.
*H04Q 7/00* (2006.01)

(52) U.S. Cl. ..................................... 370/328

(58) Field of Classification Search ........................ None
See application file for complete search history.

(56) References Cited

U.S. PATENT DOCUMENTS

| | | | |
|---|---|---|---|
| 6,826,193 B1 | 11/2004 | Peisa | |
| 7,463,602 B2 * | 12/2008 | Farnsworth et al. | 370/329 |
| 2001/0055971 A1 | 12/2001 | Irwin et al. | |
| 2004/0132455 A1 | 7/2004 | Stumpert et al. | |
| 2005/0250504 A1 * | 11/2005 | Mikola | 455/450 |

OTHER PUBLICATIONS

3GPP TR 25.922 V3.7.0 (Mar. 2002), Radio resource management strategies, 74 pages, 2002.*
3rd Generation Partnership Project, "Technical Specification Group Radio Access Network; Radio Resource Control (RRC); Protocol Specification", 3GPP TS 25.331 V5.12.0 (Mar. 2005).
International Search Report—PCT/US06/010954—International Search Authority, European Patent Office—Sep. 6, 2006.
Written Opinion—PCT/US06/010954—International Search Authority, European Patent Office—Sep. 6, 2006.
International Preliminary Report on Patentability—PCT/US06/010954—The International Bureau of WIPO, Geneva, Switzerland—Sep. 25, 2007.

* cited by examiner

*Primary Examiner*—Frank Duong
(74) *Attorney, Agent, or Firm*—George J. Oehling; Francois A. Pelaez (57) ABSTRACT

A scheme is provided for indexing and storing radio bearer configurations for a UMTS wireless communication network, such as a UTRAN. A radio network controller maintains a list of radio bearer configurations and an identifier for each configuration. One or more of these configurations and their identifiers are sent to a mobile terminal in the network. The mobile terminal stores these configurations and identifiers for future reference. This enables an on-the-fly configuration scheme in which the network controller can reference a particular stored configuration by its identifier to cause the mobile terminal to use that configuration to setup wireless transmitter and/or receiver. The identifiers may have contiguous values so that the network controller can transmit a range (e.g., starting identifier and ending identifier) to the mobile terminal rather than each identifier. When a configuration is modified or removed, the network controller may reassign identifiers to maintain contiguous values.

19 Claims, 7 Drawing Sheets

STORED RADIO BEARER CONFIGURATIONS FOR UMTS NETWORKS

CLAIM OF PRIORITY UNDER 35 U.S.C. §119

The present Application for Patent claims priority to U.S. Provisional Application No. 60/665,221 entitled "Stored Radio Bearer Configuration for UMTS" filed Mar. 25, 2005, and U.S. Provisional Application No. 60/724,005 entitled "Stored Radio Bearer Configuration for UMTS" filed Oct. 6, 2005, both provisional applications assigned to the assignee hereof and hereby expressly incorporated by reference herein.

BACKGROUND

1. Field

The present invention relates to wireless communications, and more specifically, to schemes for efficiently updating radio bearer configurations of mobile devices in a UMTS network.

2. Background

In third generation wireless mobile communication technology, Universal Mobile Telecommunication System (UMTS), also known as 3GSM (third generation Global System for Mobile Communications), is one communication protocol used for communications on a wireless network. One such type of wireless network is a UMTS Terrestrial Radio Access Network (UTRAN) which typically includes base stations and controllers to form the UMTS wireless network. This wireless communications network, commonly referred to as a 3G (for 3rd Generation) network, can carry many traffic types, from real-time circuit switched traffic to Internet Protocol (IP)-based packet switched. The UTRAN allows connectivity between user equipment (UE), such as mobile phones or wireless communication devices, and to devices on other communication networks.

Base stations typically include transmitters and receivers used to communicate directly with the UE, which may move freely around a network. A Radio Network Controller (RNC) governs communications on in the UTRAN by controlling the operation of the base stations on the network. The RNC carries out radio resource management, some of the mobility management functions and is the point where encryption is done before user data is sent to and from the mobile.

Under UTRAN, the RNC can configure UEs operating within the network to operate according to particular communication system parameters. (See 3GPP Technical Specification 25.331) For example, during initiation or reconfiguration a Radio Bearer Setup message may be sent by the RNC to a UE that configures a transmitter and/or receiver in the UE to operate according to parameters (e.g., combination of transmitted and received data blocks, mapping between channels and services, etc.) sent in the Radio Bearer Setup message. The UE may receive a new Radio Bearer Setup message when it is started or when it awakes from a standby mode. For example, UEs may be configured to conserve power by switching its transmitter and/or receiver On and Off, causing it to have to reset its transmitter and/or receiver parameters. Since a UE coming back On does not know the current bearer settings for the RNC, it receives a Radio Bearer Setup message with current parameters. The process of obtaining this new bearer configuration parameters can cause noticeable communication delays in the operation of a UE since the configuration parameters are transmitted to the UE each time. Thus, a way is needed to obtain UE bearer parameters more efficiently and without the delay of receiving a new Radio Bearer Setup message each time.

SUMMARY

One feature provides a method for managing stored radio bearer configurations by a Universal Mobile Telecommunication System (UMTS) radio network controller. A different identifier is associated with each radio bearer configuration. Then, one or more radio bearer configurations and their associated identifiers are transmitted to a mobile terminal. One or more identifiers from the mobile terminal are received indicating the radio bearer configurations stored by the mobile terminal. A configuration identifier is transmitted from the radio network controller to the mobile terminal to indicate which configuration should be used by the mobile terminal. The configuration identifiers may be contiguous values in a range which the network controller transmits by defining a starting identifier and an ending identifier. Radio bearer configuration updates may be performed by (a) updating a parameter of a first radio bearer configuration, (b) associating a new identifier with the updated first radio bearer configuration, (c) transmitting the updated first radio bearer configuration and its new identifier, and (d) invalidating a previous identifier for the first radio bearer configuration.

Another novel aspect provides a radio network controller comprising (a) a communication interface to wirelessly communicate with one or more mobile terminals operating on a Universal Mobile Telecommunication System (UMTS), (b) a storage device to store one or more radio bearer configurations to configure transmissions to and/or from the one or more mobile terminals, and (c) a processing circuit coupled to the communication interface and storage device. The processing unit may be configured to (a) associate a different identifier with each radio bearer configuration, (b) transmit one or more radio bearer configurations and their associated identifiers to a mobile terminal, (c) receive one or more identifiers from the mobile terminal indicating the radio bearer configurations stored by the mobile terminal, and (d) transmit a configuration identifier to the mobile terminal to indicate which configuration should be used by the mobile terminal. The processing circuit may also be configured to (a) update a parameter of a first radio bearer configuration, (b) associate a new identifier with the updated first radio bearer configuration, (c) transmit the updated first radio bearer configuration and its new identifier to the mobile terminal, and (d) invalidate a previous identifier for the first radio bearer configuration.

Yet another feature provides a method for managing stored radio bearer configurations by a mobile terminal. One or more radio bearer configurations and their associated identifiers are received from a Universal Mobile Telecommunication System (UMTS) radio network controller. The received configurations and identifiers are then stored at the mobile terminal. One or more identifiers from the mobile terminal are transmitted to the network controller indicating the radio bearer configurations stored in the mobile terminal. A radio transmitter and/or receiver in the mobile terminal are then configured according to parameters of a stored configuration identified by the network controller using its associated identifier. An updated radio bearer configuration having a first identifier may be received by the mobile terminal. A previously stored radio bearer configuration is replaced with the updated radio bearer configuration. Any previous identifier for the previously stored radio bearer configuration is then invalidated.

Yet another implementation provides a mobile terminal comprising: (a) a communication interface to wirelessly communicate with a radio network controller of a Universal Mobile Telecommunication System (UMTS) network, (b) a storage device to store one or more radio bearer configurations to configure the communication interface, and (c) a processing circuit coupled to the communication interface and storage device. The processing unit may be configured to (a) receive one or more radio bearer configurations and their associated identifiers from a Universal Mobile Telecommunication System (UMTS) network controller, (b) store the received configurations and identifiers in the storage device, and (c) configure a radio transmitter and/or receiver in the mobile terminal according to parameters of a stored configuration identified by the network controller using its associated identifier. The processing circuit may also be configured to transmit one or more identifiers from the mobile terminal to the network controller indicating the radio bearer configurations stored in the mobile terminal. Additionally, the processing circuit may be further configured to (a) receive an updated radio bearer configuration for a previously stored radio bearer configuration, the updated radio bearer configuration having a first identifier, and invalidate a previous identifier for the previously stored radio bearer configuration.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc.

In the following description, certain terminology is used to describe certain features of one or more embodiments of the invention. For instance, the terms "user equipment" (UE), "mobile terminal", "mobile device", "wireless device" are interchangeably used to refer to mobile phones, pagers, wireless modems, personal digital assistants, personal information managers, palmtop computers, laptop computers, and/or other mobile communication/computing devices which communicate, at least partially, through a cellular or wireless network.

One feature provides a scheme for indexing and storing radio bearer configurations for a UMTS wireless communication network, such as a UTRAN. For instance, a Radio Bearer Setup message and, secondarily, other messages that currently contain an explicit radio bearer configuration, are used to convey radio bearer configurations from the UTRAN to the UE. This enables an "on-the-fly" configuration scheme whereby a radio bearer configuration is set up in the conventional manner, by transmission of the configuration parameters from the UTRAN to the UE, and associating the configurations with a "stored configuration identifier" (SCI), which are then used to refer to the configuration in future messages.

Figure 1:
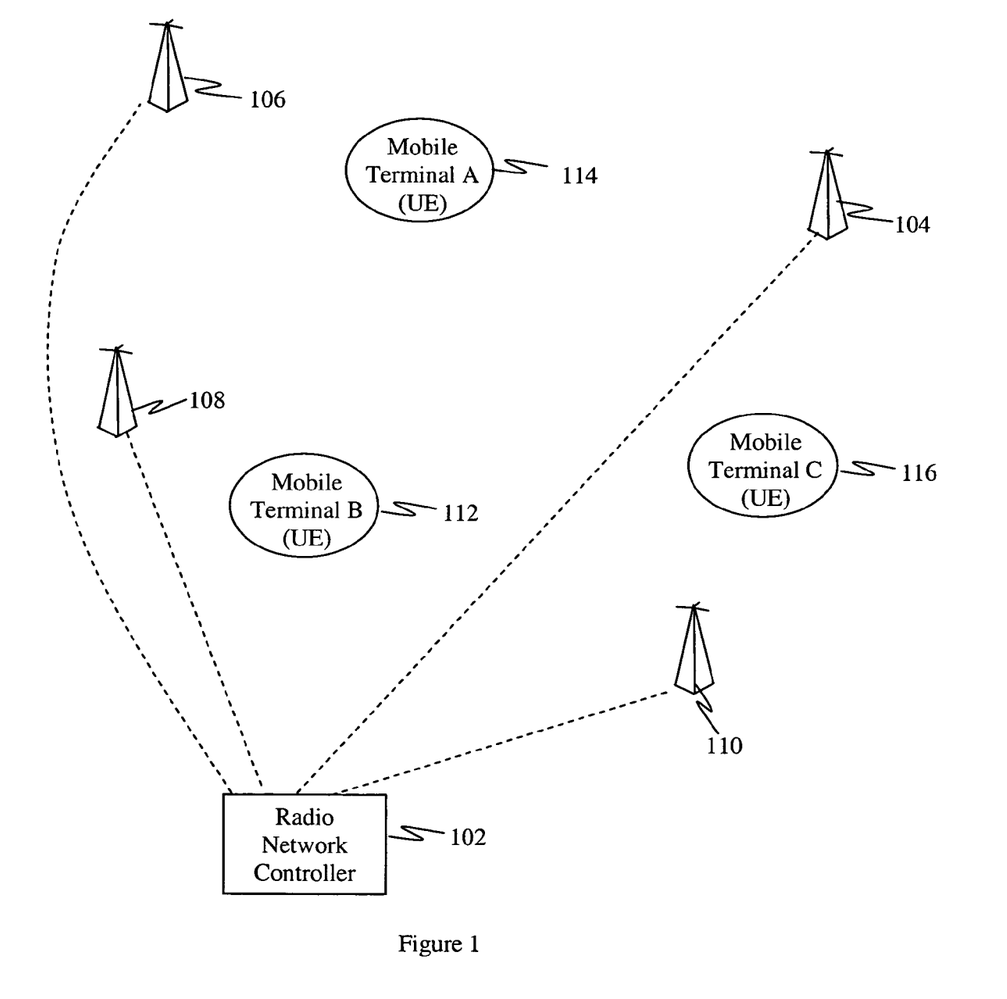
FIG. 1 illustrates a wireless network in which stored configuration identifiers for radio bearer configurations may be deployed.

FIG. 1 illustrates a wireless network in which stored configuration identifiers for radio bearer configurations may be deployed. A wireless network includes a radio network controller 102 communicatively coupled to one or more base stations 104, 106, 108, and 110 to enable communications to and from UEs 112, 114, and 116. In some networks, such as UTRAN, the network controller 102 manages the operation of base stations 104, 106, 108, and 110 and also control the power spectrum of the UEs 112, 114, and 116 and/or the channels used for particular services. For instance, the UE 114 may receive a Radio Bearer Setup message that allows it to configure its transmitter and/or receiver parameters, such as combination of transmitted and received data blocks, mapping between channels and services, etc. In conventional communication systems, such messages may be sent to the UE when it is started or when it awakens from a transmitter and/or receiver power saving or standby mode. Under such conventional schemes, the awakening UE does not know if the network has changed any communication parameters (e.g., mapping between channels and services, etc.). Thus, the UE receives a new Radio Bearer Setup message with particular configuration parameters (e.g., transmitter and/or receiver parameters). The process of receiving new configuration parameters can cause perceivable delays in the performance or operation of a UE. That is, a user may notice a significant delay from the time the UE is started or awakened to the time when it can communicate.

To address this delay in obtaining a bearer, a novel feature provides for storing one or more configurations in the UE and associating a stored configuration identifier (SCI) with each configuration. An initial Radio Bearer Setup message may include parameters for one or more bearer configurations that are individually identifiable by a SCI. These one or more configurations are stored by the UE. Subsequent Radio Bearer Setup messages by the radio network controller 102 to the UE need not include bearer configuration parameters but can simply include an SCI that references a bearer configuration stored in the UE. This avoids the delay of transmitting a complete set of configuration parameters every time a Radio Bearer Setup message is sent. The UE can simply use the received SCI to retrieve a stored bearer configuration and setup its transmitter and/or receiver accordingly.

Figure 2:
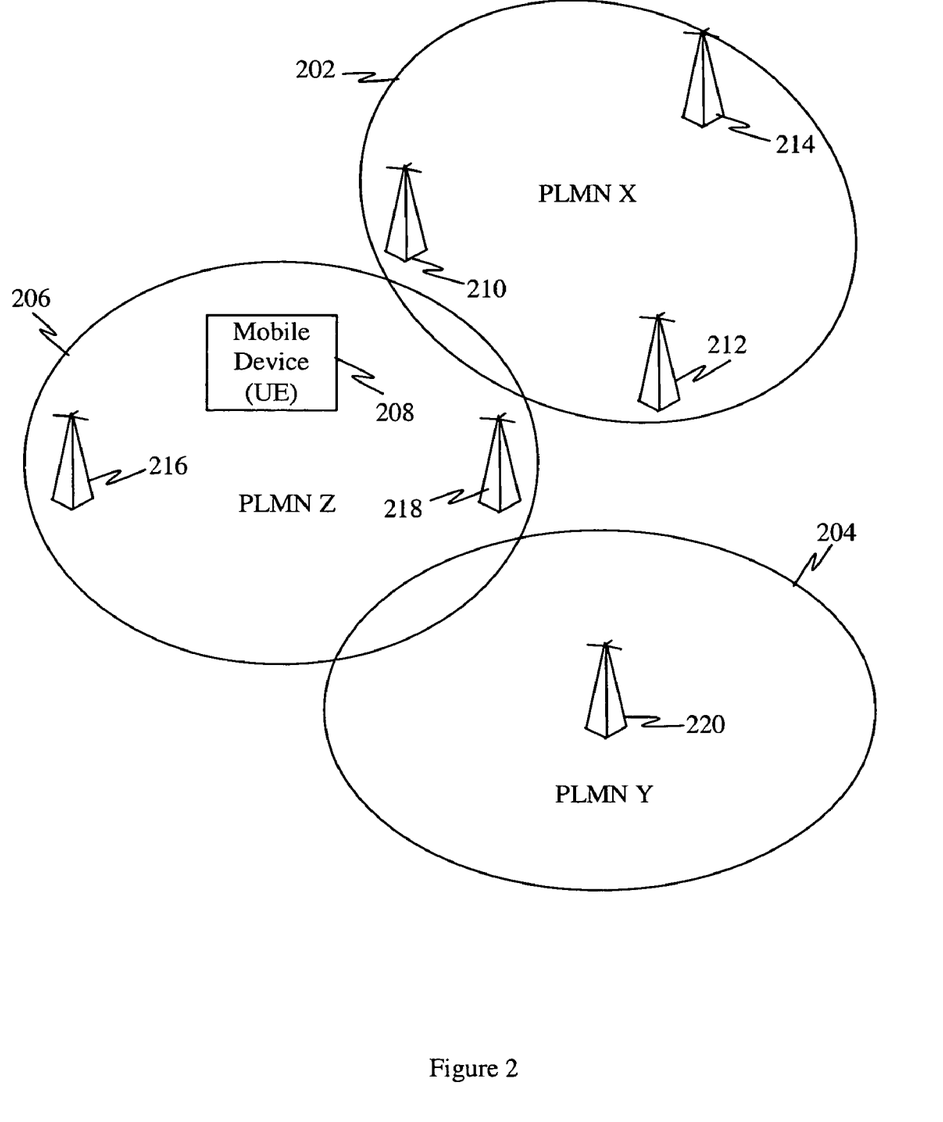
FIG. 2 illustrates a plurality of wireless networks in which stored configuration identifiers for radio bearer configurations may be deployed.

FIG. 2 illustrates a plurality of wireless networks 202, 204, and 206 in which stored configuration identifiers for radio bearer configurations may be deployed. Each network 202, 204, and 206 may include one or more base stations 210, 212, 214, 216, 218, and 220 which provide wireless coverage in each region. A UE 208 may move among the wireless networks 202, 204, and 206 (e.g., public land mobile networks PLMN X, PLMN Y, PLMN Z) and communicate through the wireless network in which it is located. The UE 208 may be configured to store one or more sets of radio bearer configurations which are uniquely identifiable by a corresponding configuration identifier.

In one embodiment, each stored radio bearer configuration may be limited to a single wireless network (e.g., PLMN Z). Within a given wireless network, a particular radio configuration is associated with a single SCI, as opposed to each UE having different SCIs for the same radio bearer configuration in the wireless network. However, different wireless networks 202, 204 and 206 may use their own SCIs for radio bearer configurations specified within each wireless network. Thus, the same identifier may be used for different radio bearer configurations in different wireless networks 202, 204 and 206. Within each wireless network 202, 204 and 206, the SCIs are mapped to particular radio bearer configurations which are managed by the network (e.g., UTRAN). Each UE 208 in a wireless network 202, 204 and 206 synchronizes its SCIs with those of the network through which it communicates. This means that as a UE 208 moves into a particular wireless network region 202, 204, and 206, it acquires the radio bearer configuration(s) and SCIs defined by that wireless network.

To implement stored radio bearer configurations and identifiers, one feature provides for the adding an SCI field to the conventional Radio Bearer Setup message. This SCI field can be used for two purposes. First, when accompanied by a full radio bearer configuration, the SCI field indicates to the UE that it should associate the SCI therein with that particular radio bearer configuration in future. Second, when the UE is already storing a radio bearer configuration, the SCI indicates that the radio bearer being set up should use the stored configuration corresponding to the SCI.

Figure 3:
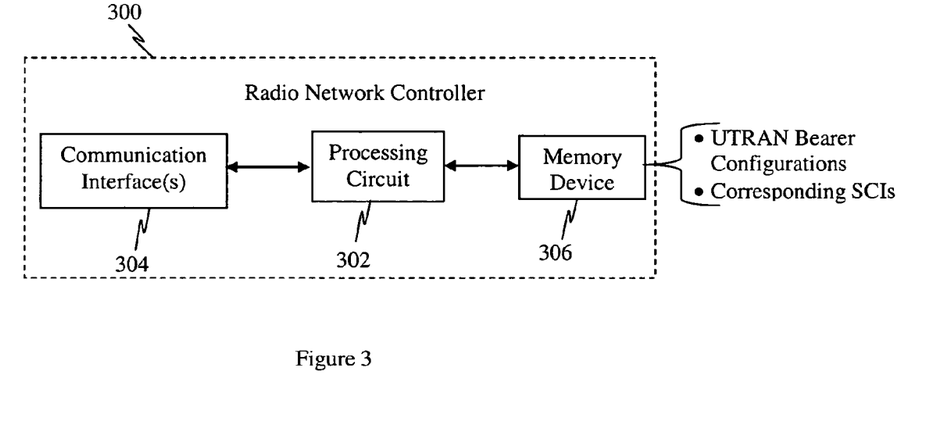
FIG. 3 illustrates a radio network controller that may be configured to communicate manage communications within a wireless network and deploy stored configurations and SCIs to mobile devices (UEs) within the network.

FIG. 3 illustrates a radio network controller 300 that may be configured to communicate manage communications within a wireless network and deploy stored configurations and SCIs to mobile devices (UEs) within the network. The radio network controller 300 includes a processing circuit 302 coupled to a communication interface 304, and a memory or storage device 306. The communication interface 304 may include a wireless interface to communicate with wireless UEs via one or more base stations and/or other wired or wireless interfaces to communicate with other wired and/or wireless networks. The memory device 306 may serve to store radio bearer configurations (e.g., UTRAN configurations) for the wireless network controlled by the radio network controller 300 as well as SCIs corresponding to those radio bearer configurations.

The radio network controller 300, through its processing unit 302, may be configured to send Radio Bearer Setup messages to UEs operating within its wireless network. The Radio Bearer Setup message may include one or more radio bearer configurations as well identifiers (SCIs) corresponding to each configuration. Depending on the state of the wireless network and UE, the Radio Bearer Setup message may include both the radio bearer configuration(s) and SCIs or just the SCIs.

When a UE is first configured within the wireless network (e.g., as when it is first started or when it enters the wireless network), the Radio Bearer Setup message includes one or more radio bearer configurations (e.g., transmitter parameters, etc.) for the network and their corresponding SCIs. This message may indicate which radio bearer configuration, from the one or more radio bearer configurations received, the UE should use to establish communications with the wireless network.

Subsequent Radio Bearer Setup messages (e.g., sent when the UE awakens from standby or sleep modes) may include just a SCI, corresponding to a radio bearer configuration stored by the UE, which the UE should use to setup its transmitter and/or receiver for communications with the wireless network (e.g., UTRAN).

When the radio network controller 300 wishes to change the radio bearer configuration used by a UE to another radio bearer configuration, it requests the radio bearer configurations stored in the UE. For instance, the radio network controller 300 may send a Radio Resource Control (RRC) Connection Setup message to a UE which indicates that the UE should send its stored configuration list to the radio network controller 300. This way, the radio network controller 300 knows which configurations are stored and available for use at a UE.

When the radio network controller 300 updates or changes its radio bearer configurations(s), the UEs are notified by the radio network controller 300 sending a Radio Bearer Setup message that includes the radio bearer configuration(s) along with their corresponding SCIs. In various implementations, the radio network controller 300 may send all radio bearer configurations, a subset of radio bearer configurations, or just new or updated radio configurations to a UE. The UEs can then replace any previous configuration(s) with the new configuration(s) or add new configurations to its existing configurations already stored in the UE. For example, in the case that the radio network controller 300 wishes to setup a bearer using a configuration that is not in a UE's configuration list, the radio network controller 300 sends an explicit description of the bearer configuration (e.g., transmitter parameters, etc.) in the Radio Bearer Setup message, along with an SCI. The UE then stores this new configuration and corresponding SCI.

Figure 4:
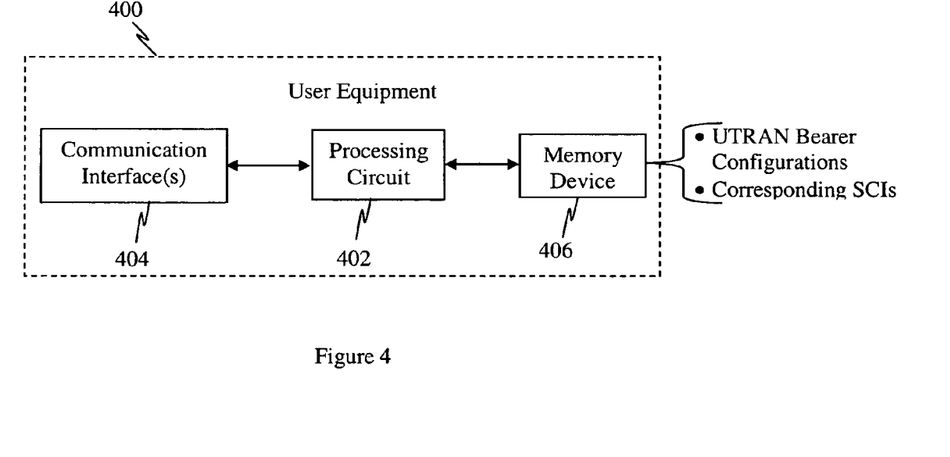
FIG. 4 illustrates a user equipment (UE), such as a mobile terminal or phone, which may be configured to communicate through a wireless network and employ stored radio bearer configurations and SCIs to setup its transmitter and/or receiver.

FIG. 4 illustrates a user equipment (UE) 400, such as a mobile terminal or phone, which may be configured to communicate through a wireless network and employ stored radio bearer configurations and SCIs to setup its transmitter and/or receiver. The UE 400 may include a processing circuit 402, a communication interface 404, and a memory or storage device 406. The communication interface 404 may include a radio communication device with a transmitter and/or receiver that serve to communicatively couple the UE 400 to a wireless communication network. The memory device 406 may store radio bearer configurations and their corresponding SCIs that may be received in a Radio Bearer Setup message, or other message(s), from the wireless network (e.g., UTRAN).

The processing circuit 402 may be configured to select the radio bearer configuration indicated by the wireless network (e.g., via a Radio Bearer Setup message) and use the corresponding parameters (e.g., in the radio bearer configuration) to setup its communication interface 404 (e.g., wireless transmitter and/or receiver) for communications with the network. In some implementations, the UE 400 may inform the radio network controller of its stored configurations via a Radio Bearer Setup Complete message. This message may inform a radio network controller whether an assignment of a new configuration successfully displaced an old one.

In other instances, if for some reason the UE's list of stored configurations changes while the radio resource control (RRC) connection is in place, the UE 400 sends a UE Capability Information message to the radio network controller to update or notify the network of the radio bearer configurations available at the UE. That is, if a RRC connection is already operational, the UE 400 may notify the radio network controller of its stored configurations by using a UE Capability Information message.

Figure 5:
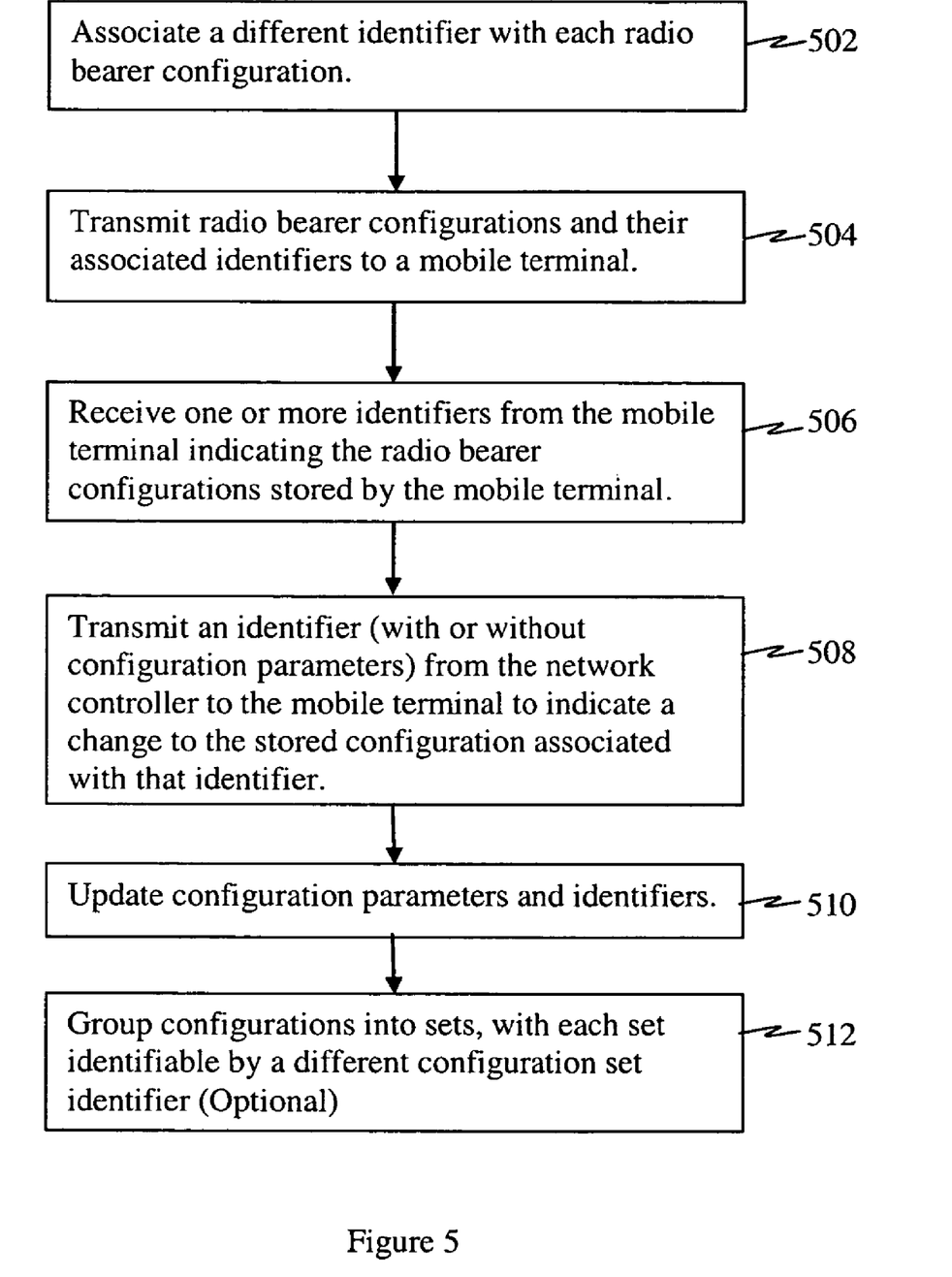
FIG. 5 illustrates a method for managing stored radio bearer configuration by a UMTS network controller according to one implementation.

FIG. 5 illustrates a method for managing stored radio bearer configuration by a Universal Mobile Telecommunication System (UMTS) network controller according to one implementation. A different identifier is associated with each radio bearer configuration 502. The configuration identifiers may be contiguous values in a range which the network controller transmits, for example, by defining a starting identifier and an ending identifier.

One or more radio bearer configurations and their associated identifiers are then transmitted to a mobile terminal 504. In reply, the network controller may receive one or more identifiers from the mobile terminal indicating the radio bearer configurations stored by the mobile terminal 506. The network controller may transmit a configuration identifier (with or without configuration parameters) to the mobile terminal to indicate which configuration should be used by the mobile terminal 508.

The network controller may, from time to time, update configuration parameters and identifiers 510. For instance, this may be accomplished by 1) updating a parameter of a first radio bearer configuration, 2) associating a new identifier with the updated first radio bearer configuration, 3) transmitting the updated first radio bearer configuration and its new identifier, and 4) invalidating any previous identifier associated the first radio bearer configuration.

In some implementations, the configurations may be grouped into sets, with each set identifiable by a different configuration set identifier. The network controller can then transmit the one or more radio bearer configurations as a grouped set, with each configuration in the set identifiable by its configuration identifier.

In some implementations, the method illustrated in FIG. 5 may be operational on a network controller as illustrated in FIG. 3.

Figure 6:
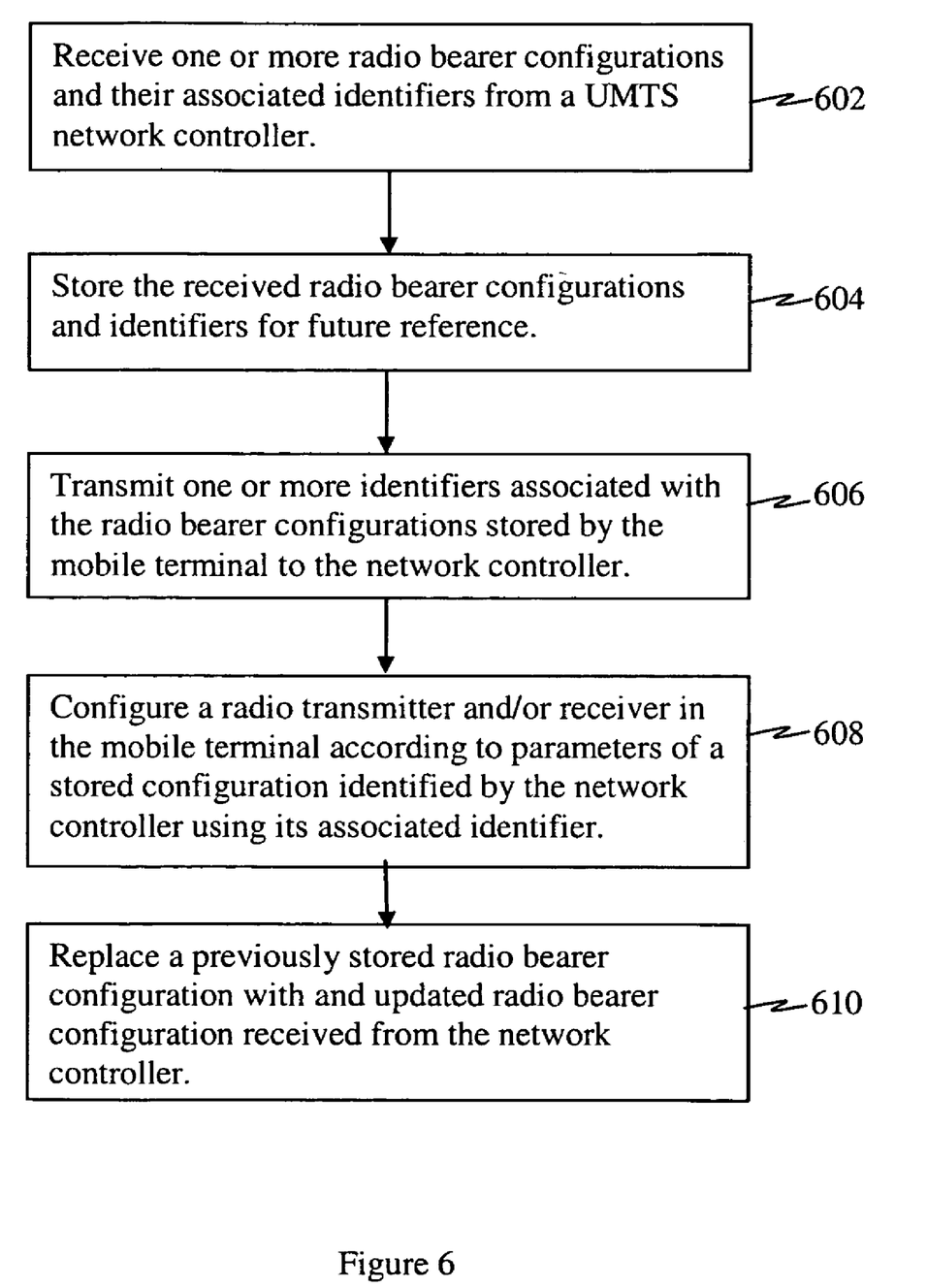
FIG. 6 illustrates a method for managing stored radio bearer configurations by a mobile terminal.

FIG. 6 illustrates a method for managing stored radio bearer configurations by a mobile terminal. A mobile terminal receives one or more radio bearer configurations and their associated identifiers from a Universal Mobile Telecommunication System (UMTS) network controller 602. The mobile terminal then stores the received configurations and identifiers 604. In some implementations, the configuration identifiers are contiguous values which are identified by the network controller by a starting identifier and an ending identifier. Either in response to the received configurations or in reply to other request, the mobile terminal may transmit to the network controller one or more identifiers associated with the radio bearer configurations stored by the mobile terminal 606. The mobile terminal may also configure its radio transmitter and/or receiver according to parameters of a stored configuration identified by the network controller using its associated identifier 608.

The mobile terminal may also replace a previously stored radio bearer configuration with an updated radio bearer configuration 610. This process may include 1) receiving an updated radio bearer configuration having a first identifier from the network controller, and 2) invalidating any previous identifier for the previously stored radio bearer configuration. Additionally, the radio bearer configurations may be grouped and stored as a set of configurations, each configuration set identifiable by a different set identifier.

In some implementations, the method illustrated in FIG. 6 may be operational on a network controller as illustrated in FIG. 4.

Figure 7:
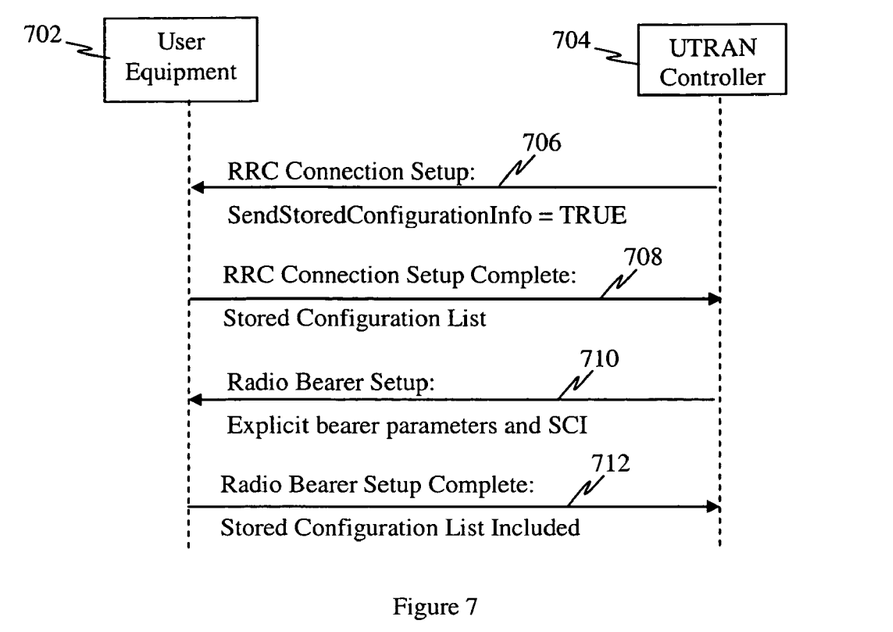
FIG. 7 illustrates one example of a scheme to setup stored configurations and corresponding identifiers in a UMTS network.
Figure 8:
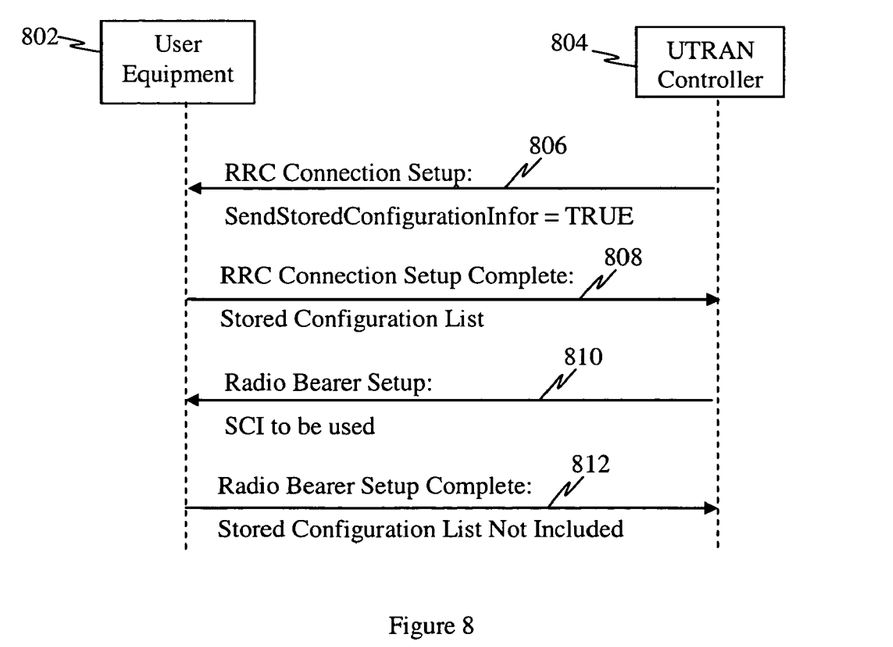
FIG. 8 illustrates an example of a scheme using stored configuration identifiers in a UE that enable a UMTS radio network controller to signal a particular operating configuration.

FIGS. 7 and 8 illustrate methods for using stored radio bearer configurations in a wireless network when a UE awakens or is started. While the examples illustrated and described in FIGS. 7 and 8 refer to defined UMTS messages, these schemes may be implemented using other messages in other types of wireless communication networks.

FIG. 7 illustrates one example of a scheme to setup stored configurations and corresponding identifiers in a UMTS network. This scheme assumes that the UE 702 is configured to store one or more radio bearer configurations. In this particular method, the UE 702 does not include the radio bearer configuration that the UTRAN controller 704 would like to use. A Radio Resource Control (RRC) Connection Setup message 706 is sent by a UTRAN controller 704 requesting that the UE 702 provide its stored radio bearer configurations. The UE 702 replies by sending a RRC Connection Setup Complete message 708 which includes a list of stored configurations. This configuration list permits the UTRAN controller 704 to identify the radio bearer configurations stored in the UE 702. In various implementations, this list of stored configurations may include the parameters for each configuration stored in the UE 702 and/or one or more identifiers associated with the stored configurations. In this particular example, the UE 702 does not contain a radio bearer configuration that the UTRAN controller 704 would like to use. Thus, the UTRAN controller 704 sends a Radio Bearer Setup message 710, including the parameters of one or more radio bearer configurations and corresponding identifiers to the UE 702. The UE 702 replies with a Radio Bearer Setup Complete message 712 including the list of one or more configurations (e.g., identifiers associated with radio bearer configurations) stored in the UE 702.

FIG. 8 illustrates an example of a scheme using stored configuration identifiers in a UE that enable a UMTS radio network controller to signal a particular operating configuration. In this scheme, the UE 802 already includes a stored radio bearer configuration that the UTRAN controller 804 would like to use. A Radio Resource Control (RRC) Connection Setup message 806 is sent by a UTRAN controller 804 requesting that the UE 802 provide its stored radio bearer configuration. The UE 802 replies by sending a RRC Connection Setup Complete message 808 which includes a list of stored configuration identifiers. This configuration identifier list permits the UTRAN controller 804 to identify the radio bearer configurations stored in the UE 802. The UTRAN controller 804 determines that the UE 802 already includes a desired configuration and sends a Radio Bearer Setup message 810 with the identifier (i.e., SCI) corresponding to the desired configuration. This indicates to the UE 802 that the stored configuration associated with the received identifier should be used. In this case, the UE's 802 list of stored configurations is not affected, so the Radio Bearer Setup Complete message 812 does not need to contain the updated configuration list.

In addition to the Radio Bearer Setup message, other RRC messages that may include the Radio Bearer Reconfiguration message, Transport Channel Reconfiguration, Physical Channel Reconfiguration message, and Cell Update Confirm message. These messages may be modified to include the SCI field corresponding to one or more radio bearer configurations. In one implementation, the RRC Connection Setup message need not be changed to include the SCI since the network controller sending this message does not yet have the UE's list of stored configurations (i.e., it arrives in the subsequent RRC Connection Setup Complete message). The SCI field in such messages may serve to 1) associate an SCI with an explicit radio bearer configuration, 2) reassign a new SCI to an existing stored radio bearer configuration, and/or 3) invoke a particular stored configuration associated with an SCI to be used by the UE.

Another novel feature provides for synchronizing the SCIs stored in a UE and the network controller (e.g., UTRAN). In order for a radio network controller to use SCIs to a configure UE, it is assumed that a particular SCI always refers to the same configuration on both the radio network controller and UE. This synchronisation could be achieved in several different ways. For instance, in a first approach, globally-unique SCI values may be employed so that each value is unambiguous within a given network (e.g., PLMN). In a second approach, a value-tag mechanism may be employed in which each SCI is associated with an additional value-tag field that the UE can use to determine whether its stored version of that SCI matches the version in the radio network controller. In a third approach, an expiry time is employed in which a UE is configured to delete stored configurations after a fixed interval, and the radio network controller does not reuse any SCI value within that interval. In a fourth approach, information is broadcast by the radio network controller indicating which SCI values are in use along with a mechanism that ensures that these values are not reused in a way that may be ambiguous to the UE. In various implementations, each of these four approaches may be employed by itself or in combination with one or more of the approaches.

In the first approach for SCI synchronization, where globally-unique SCIs are employed by the network controller, the SCI field may to become quite large. That is, in order to allow for future configurations over an unknown period for a potentially great number of services, the SCI field used in various messages may be quite sizeable. This may cause the UE to send a potentially large block of SCIs when queried about its stored configurations. Such large SCI field or list defeats the benefit of the stored-configuration feature since this large list of SCI values are sent in the Radio Bearer Setup message. Since the network controller may not maintain a very large number of stored configurations at any one time, most of the bits in the SCI field would be effectively wasted. While the SCI field may be reduced in size, so that collisions between SCIs were not impossible but merely unlikely, the resulting SCI field or list would still be long and some mechanism would still be needed to resolve the rare circumstances where an SCI is used to represent different radio bearer configurations.

In the second approach for SCI synchronization, a value tag mechanism is employed. This value-tag mechanism is essentially the same as using globally-unique SCIs. The bits of the value tag have the effect of extending the SCI itself, and the value tag needs to be long enough to prevent false positives in which a UE has not only a stale configuration but a stale value tag associated with that configuration. Compared to a true unique-identifier approach, the value tag approach is slightly more efficient within the radio bearer setup process since the value tag, once agreed upon, can be omitted from future messages.

In the third approach for SCI synchronization, an expiry time is employed in which the UE is responsible for discarding its stored configurations when the predefined time period expires. The lifetime of a stored configuration in the UE would be long (e.g., hours, days, or weeks), since many configurations would probably be essentially permanent in a particular network (e.g., UTRAN). Since UEs are likely to undergo multiple power cycles and out-of-service periods during such expiry time, this approach is inconvenient for UEs that have no clock reference with which to keep track of the expiry time.

In the fourth approach for SCI synchronization, the network controller broadcasts information about which SCIs are currently valid. In this approach, the network controller broadcasts an interval of valid SCIs values (e.g., FirstValidSCI, LastValidSCI) as part of the system information. Using this information, the UE is configured to delete stored configurations for the serving network (e.g., PLMN) whose SCIs are not in the received interval of SCI values (e.g., 3 through 7).

To render an SCI obsolete, the network controller may simply changes the valid SCI interval to exclude the old configuration's SCI. When the UE next reads the system information, it updates its stored configurations accordingly. Note that, if the affected (i.e., deleted or modified) configuration is not at an endpoint of the interval, some rearrangement of other configurations is necessary. For this reason, it is desirable for the network controller to be able to indicate a reassignment of SCIs to the UE (e.g., change the SCI for configuration A from x to y). This reassignment need only include the old and new SCIs, there is no need to include an explicit description of the configuration parameters.

Under this scheme, the only way a "collision" may be encountered is where a UE is out of service when the SCI is signaled as invalid and the UE does not return to service until the same SCI has been reassigned to a different configuration. This failure situation can be prevented by having an expiration timer (e.g., 6-hour timer already available in the UMTS protocol) that invalidates system information when the 6-hour limit is reached. Once the expiration period expires, the UE simply deletes its valid SCI interval along with any stored configurations since the UE no longer knows if they are valid. It can then obtain a new set of configurations and corresponding SCIs from the network controller. Assuming the network controller always waits more than six hours before reusing an SCI value, this method renders collisions impossible.

Figure 9:
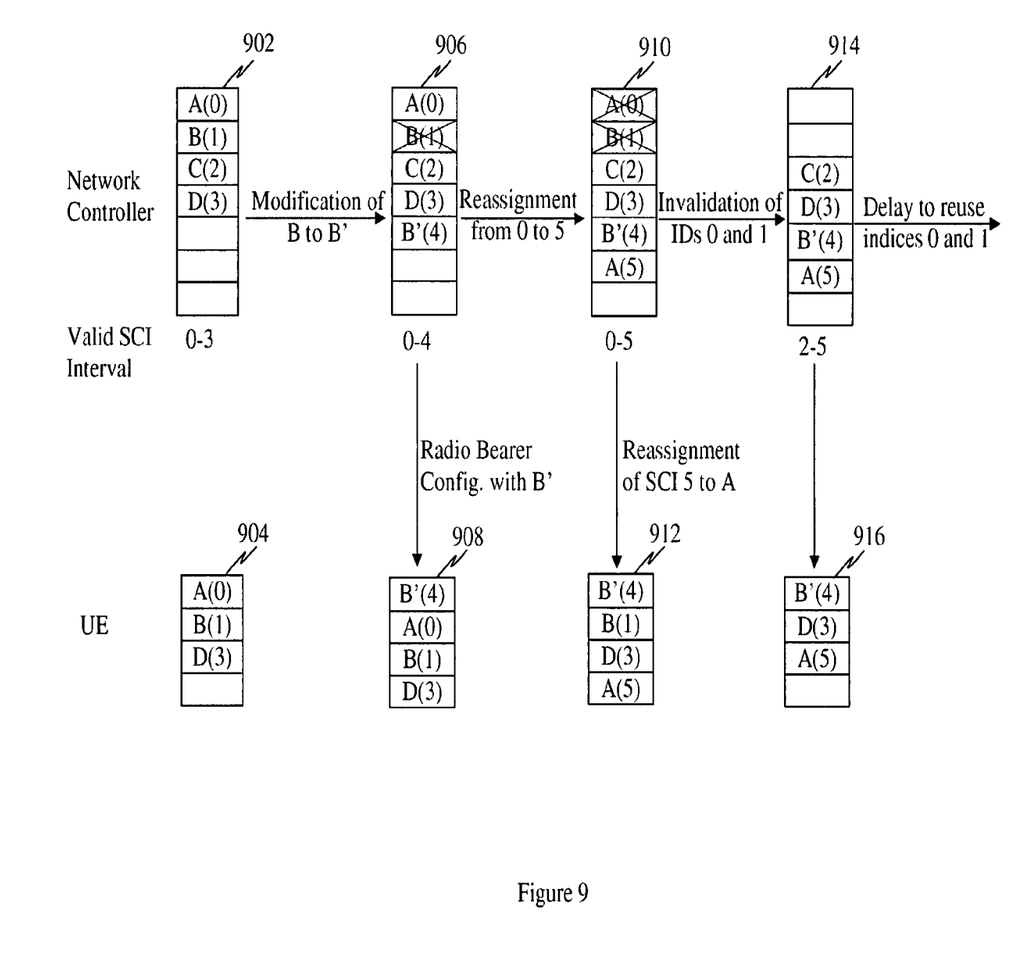
FIG. 9 illustrates how a method of implementing SCI updating and deletion according to one approach to synchronization between a radio network controller and UEs.

FIG. 9 illustrates how a method of implementing SCI updating and deletion according to one approach to synchronization between a radio network controller and UEs. At an initial stage 1, the network controller has an SCI list 902 defining four stored configurations A, B, C, and D having SCIs 0, 1, 2, and 3, respectively. The UE has been provisioned with stored configurations A, B, and D their corresponding SCIs list 904. The network controller then decides to modify configuration B into a new configuration B'. It adds configuration B' to the SCI list 906, signals the new SCI interval (e.g., indices 0-4) in the system information, and sets up a bearer configuration using configuration B' in the UE. At this point the network controller stops using configuration B and its associated SCI (e.g., 1). However, because the SCIs for the remaining valid configurations (SCI values of 0, 2, 3, 4) are not contiguous, the network controller cannot signal configuration B (having SCI value 1) as invalid. While in some implementations the network controller may use individual SCI values rather than a range of values, this approach becomes counterproductive when a large number of SCIs are being transmitted. The use of an SCI range (i.e., first SCI value, last SCI value) avoids this problem. Until the controller indicates that configuration B (having SCI value 1) is invalid, the UE SCI list 908 stores both configurations B and B'.

To make the SCIs values contiguous, the network controller reassigns configuration A from SCI value 0 to SCI value 5, as shown in SCI list 910. A UE receiving the reassignment stores only the latest copy of configuration A with SCI 5 and deletes the previous copy of configuration A with SCI 0, as shown in SCI list 912. At this point, the network controller may signal a valid SCI interval of 0 to 5, but does not actually use values 0 and 1. The SCI interval of 0 to 5 may be maintained until a sufficient number of UEs have received the reassignment of configuration A.

UEs that do not receive the reassignment broadcast (because they are unreachable or otherwise unavailable) are configured to ignore configuration A when SCI 0 is no longer signaled as a valid SCI. These UE may later receive an explicit assignment of SCI 5 to configuration A.

When a sufficient number of UEs have been updated in the network, the network controller deletes SCIs 0 and 1 from its SCI list 914 and broadcasts a valid SCI interval of 2 to 5. When a UE receives this updated SCI interval, it deletes its stored configuration B (SCI 1) from its SCI list 916. At this point, the only UEs that may still store SCIs values 0 and 1 are out of service (e.g., turned off or in another network). Such UEs may return to service at any time. To avoid "collisions" between SCIs (e.g. where the same SCI is used for different bearer configurations by the UE and network controller), an expiry time is used by the UE and network controller. Thus, the network controller delays at least the period of the expiry time (e.g., hours, days, weeks) before reassigning or reusing the deleted SCIs 0 and 1. This permits the SCIs 0 and 1 to be expired (by the expiry timer) at the UEs.

Another aspect of the invention provides for defining sets of configurations on a per-set basis rather than a per-configuration basis. That is, a plurality of radio bearer configurations can be identified by a set identifier with an index identifying particular configurations within the set. Instead of the network controller having to transmit a large number of configurations to a UE (as when using per-configuration identifiers only), this approach reduces broadcast sizes since only configurations in a particular set would be sent and/or identified to the UE. One advantage of this approach is that it reduces the bandwidth needed for signaling configurations to the UEs. At the same time, this approach also allows the network controller the flexibility of making minor updates within a configuration set.

The apparatus, devices, and/or components illustrated in FIGS. 3 and/or 4 may be configured to perform the methods, features, or steps illustrated in FIGS. 5, 6, 7, 8, and/or 9.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A method for managing stored radio bearer configurations by a Universal Mobile Telecommunication System (UMTS) radio network controller comprising:
   associating a different identifier with each radio bearer configuration;
   transmitting one or more radio bearer configurations and their associated identifiers to a mobile terminal;
   receiving one or more identifiers from the mobile terminal indicating the radio bearer configurations stored by the mobile terminal; and
   transmitting a configuration identifier to the mobile terminal to indicate which configuration should be used by the mobile terminal.

2. The method of claim 1 wherein the configuration identifiers are contiguous values in a range which the network controller transmits by defining a starting identifier and an ending identifier.

3. The method of claim 1 further comprising:
   updating a parameter of a first radio bearer configuration;
   associating a new identifier with the updated first radio bearer configuration;

transmitting the updated first radio bearer configuration and its new identifier; and invalidating a previous identifier for the first radio bearer configuration.

4. The method of claim 1 further comprising:
grouping configurations into sets, each set identifiable by a different set identifier.

5. The method of claim 4 further comprising:
transmitting the one or more radio bearer configurations as a grouped set, with each configuration in the set identifiable by its configuration identifier.

6. The method of claim 1 further comprising:
broadcasting one or more configuration identifiers to mobile terminals in the wireless network to indicate which identifiers are valid.

7. The method of claim 1 wherein identifiers expire after a predefined period of time.

8. The method of claim 1 wherein a UMTS Radio Bearer Setup message is used by the UMTS network controller to transmit the configuration identifier to the mobile terminal to indicate which configuration should be used by the mobile terminal.

9. The method of claim 1 wherein the one or more identifiers from the mobile terminal are received in response to a UMTS Radio Resource Control (RRC) Connection Setup message from the UMTS network controller.

10. A radio network controller comprising:
a communication interface to wirelessly communicate with one or more mobile terminals operating on a Universal Mobile Telecommunication System (UMTS);
a storage device to store one or more radio bearer configurations to configure transmissions from the one or more mobile terminals; and
a processing circuit coupled to the communication interface and storage device and configured to
associate a different identifier with each radio bearer configuration,
transmit one or more radio bearer configurations and their associated identifiers to a mobile terminal,
receive one or more identifiers from the mobile terminal indicating the radio bearer configurations stored by the mobile terminal, and
transmit a configuration identifier to the mobile terminal to indicate which configuration should be used by the mobile terminal.

11. The radio network controller of claim 10 wherein the processing circuit is further configured to
update a parameter of a first radio bearer configuration;
associate a new identifier with the updated first radio bearer configuration;
transmit the updated first radio bearer configuration and its new identifier to the mobile terminal; and
invalidate a previous identifier for the first radio bearer configuration.

12. The radio network controller of claim 10 wherein the processing circuit is further configured to
group configurations into sets, each set identifiable by a different set identifier; and
transmitting the one or more radio bearer configurations as a grouped set, with each configuration in the set identifiable by its configuration identifier.

13. A mobile terminal comprising:
a communication interface to wirelessly communicate with a radio network controller of a Universal Mobile Telecommunication System (UMTS) network;
a storage device to store one or more radio bearer configurations to configure the communication interface; and
a processing circuit coupled to the communication interface and storage device and configured to
receive one or more radio bearer configurations and their associated identifiers from a Universal Mobile Telecommunication System (UMTS) network controller,
store the received configurations and identifiers in the storage device, and
configure a radio communication device in the mobile terminal according to parameters of a stored configuration identified by the network controller using its associated identifier.

14. The mobile terminal of claim 13 wherein the processing circuit is further configured to
transmit one or more identifiers from the mobile terminal to the network controller indicating the radio bearer configurations stored in the mobile terminal.

15. The mobile terminal of claim 13 wherein the processing circuit is further configured to
receive an updated radio bearer configuration for a previously stored radio bearer configuration, the updated radio bearer configuration having a first identifier; and
invalidate a previous identifier for the previously stored radio bearer configuration.

16. The mobile terminal of claim 13 wherein the processing circuit is further configured to
receive a broadcast of valid list identifiers from the network controller; and
invalidate stored identifiers missing from the received valid list of identifiers.

17. The mobile terminal of claim 13 wherein the processing circuit is further configured to
maintain an expiration timer for the stored identifiers; and
invalidate the stored identifiers once the expiration timer has elapsed.

18. The mobile terminal of claim 13 wherein the radio communication device includes a transmitter that is configured according to parameters of the stored configuration identified by the network controller.

19. The mobile terminal of claim 13 wherein the radio communication device includes a receiver that is configured according to parameters of the stored configuration identified by the network controller.

* * * * *

UNITED STATES PATENT AND TRADEMARK OFFICE
CERTIFICATE OF CORRECTION

PATENT NO. : 7,542,444 B2
APPLICATION NO. : 11/388560
DATED : June 2, 2009
INVENTOR(S) : Masato Kitazoe, Francesco Grilli and Nathan Edward Tenny It is certified that error appears in the above-identified patent and that said Letters Patent is hereby corrected as shown below:

Title Page
Item (73) Assignee: "QULACOMM," should read --QUALCOMM--

Signed and Sealed this

Twentieth Day of October, 2009

David J. Kappos
*Director of the United States Patent and Trademark Office*